(12) United States Patent
Fromm (10) Patent No.: US 6,766,011 B1
(45) Date of Patent: Jul. 20, 2004

(54) METHOD AND APPARATUS FOR CONTROLLING A CONTACT CENTER

(75) Inventor: Laurence J. Fromm, Weston, FL (US)

(73) Assignee: Concerto Software, Inc., Westford, MA (US)

( * ) Notice: Subject to any disclaimer, the term of this patent is extended or adjusted under 35 U.S.C. 154(b) by 615 days.

(21) Appl. No.: 09/595,697

(22) Filed: Jun. 16, 2000

(51) Int. Cl.⁷ ............................................... H04M 3/00
(52) U.S. Cl. ............................ 379/265.01; 379/93.01
(58) Field of Search ........................... 379/265.01, 201, 379/93.01

(56) References Cited

U.S. PATENT DOCUMENTS

| | | | |
|---|---|---|---|
| 3,333,271 A | 7/1967 | Robinson et al. | 343/113 |
| 4,066,847 A | 1/1978 | Giordano | 179/99 |
| 4,286,118 A | 8/1981 | Mehaffey et al. | 179/18 D |
| 4,356,348 A | 10/1982 | Smith | 179/1 MN |
| 4,392,129 A | 7/1983 | Mehaffey et al. | 340/765 |
| 4,408,100 A | 10/1983 | Pritz et al. | 179/27 D |
| 4,477,698 A | 10/1984 | Szlam et al. | 179/90 BD |
| 4,494,229 A | 1/1985 | Jolissaint | 370/58 |
| 4,510,351 A | 4/1985 | Costello et al. | 179/27 D |
| 4,540,855 A | 9/1985 | Szlam et al. | 179/84 R |
| 4,593,273 A | 6/1986 | Narcisse | 340/539 |
| 4,599,493 A | 7/1986 | Cave | 179/18 FH |
| 4,600,814 A | 7/1986 | Cunniff et al. | 179/18 BC |
| 4,677,663 A | 6/1987 | Szlam | 379/211 |
| 4,692,858 A | 9/1987 | Redford et al. | 364/200 |
| 4,694,483 A | 9/1987 | Cheung | 379/34 |
| 4,720,853 A | 1/1988 | Szlam | 379/211 |
| 4,742,537 A | 5/1988 | Jesurum | 379/351 |
| 4,742,538 A | 5/1988 | Szlam | 379/361 |
| 4,742,539 A | 5/1988 | Szlam | 379/377 |
| 4,757,267 A | 7/1988 | Riskin | 379/113 |
| 4,782,463 A | 11/1988 | Sanders | 364/900 |
| 4,782,510 A | 11/1988 | Szlam | 379/88 |
| 4,792,968 A | 12/1988 | Katz | 379/92 |
| 4,797,911 A | 1/1989 | Szlam et al. | 379/67 |
| 4,811,240 A | 3/1989 | Ballou et al. | 364/518 |
| 4,829,563 A | 5/1989 | Crockett et al. | 379/309 |
| 4,858,120 A | 8/1989 | Samuelson | 364/401 |
| 4,866,638 A | 9/1989 | Cosentino et al. | 364/521 |
| 4,881,261 A | 11/1989 | Oliphant et al. | 379/215 |
| 4,894,857 A | 1/1990 | Szlam et al. | 379/67 |
| 4,896,345 A | 1/1990 | Thorne | 379/67 |
| 4,933,964 A | 6/1990 | Girgis | 379/67 |
| 4,939,771 A | 7/1990 | Brown et al. | 379/67 |
| 4,939,773 A | 7/1990 | Katz | 379/204 |
| 4,988,209 A | 1/1991 | Davidson et al. | 370/58 |
| 5,021,976 A | 6/1991 | Wexelblat et al. | 364/521 |
| 5,041,992 A | 8/1991 | Cunningham et al. | 364/518 |
| 5,062,103 A | 10/1991 | Davidson et al. | 370/58.1 |
| 5,070,525 A | 12/1991 | Szlam et al. | 379/196 |
| 5,115,501 A | 5/1992 | Kerr | 395/600 |
| 5,119,072 A | 6/1992 | Hemingway | 340/573 |

(List continued on next page.)

FOREIGN PATENT DOCUMENTS

EP 0855826 7/1998 ............ H04M/3/50

OTHER PUBLICATIONS

M2 Presswire, 3COM: Cell IT launches breakthrough multimedia call center solution based on high speed 3Com systems; Mar. 4, 1998; 1–3 webpages; Coventry.

AT & T Technology; In The Forefront With Integrated Call Centers; Winter 1992; 1–7 webpages; New York.

Telemarketing & Call Center Solutions; How a Travel–Industry Call Center Excels; Sep. 1997; 1–2 webpages; Norwalk.

*Primary Examiner*—Al Aubaidi
(74) *Attorney, Agent, or Firm*—Bourque & Associates, P.A.

(57) ABSTRACT

A switching apparatus for a contact center is integrated into a legacy contact center including a PBX. The switching capacity of both of the PBX and the switch are utilized efficiently by handing off controller specific desktop agents between the central processor and the PBX.

12 Claims, 5 Drawing Sheets

U.S. PATENT DOCUMENTS

| | | | |
|---|---|---|---|
| 5,119,475 A | 6/1992 | Smith et al. | 395/156 |
| 5,121,477 A | 6/1992 | Koopmans et al. | 395/156 |
| 5,175,761 A | 12/1992 | Ramsey et al. | 379/89 |
| 5,179,657 A | 1/1993 | Dykstal et al. | 395/161 |
| 5,179,700 A | 1/1993 | Aihara et al. | 395/650 |
| 5,206,903 A | 4/1993 | Kohler et al. | 379/309 |
| 5,214,688 A | 5/1993 | Szlam et al. | 379/67 |
| 5,276,731 A | 1/1994 | Arbel et al. | 379/88 |
| 5,309,505 A | 5/1994 | Szlam et al. | 379/88 |
| 5,345,589 A | 9/1994 | King et al. | 395/650 |
| 5,357,254 A | 10/1994 | Kah | 342/42 |
| 5,386,412 A | 1/1995 | Park et al. | 370/53 |
| 5,428,827 A | 6/1995 | Kasser | 455/161.3 |
| 5,430,792 A | 7/1995 | Jesurum et al. | 379/67 |
| 5,440,616 A | 8/1995 | Harrington et al. | 379/88 |
| 5,479,487 A * | 12/1995 | Hammond | 379/88.22 |
| 5,490,211 A | 2/1996 | Adams | 379/265 |
| 5,500,891 A | 3/1996 | Harrington et al. | 379/265 |
| 5,511,112 A | 4/1996 | Szlam | 379/88 |
| 5,511,117 A | 4/1996 | Zazzera | 379/265 |
| 5,519,773 A | 5/1996 | Dumas et al. | 379/265 |
| 5,533,109 A | 7/1996 | Baker | 379/201 |
| 5,546,456 A | 8/1996 | Vilsoet et al. | 379/265 |
| 5,553,133 A | 9/1996 | Perkins | 379/265 |
| 5,568,544 A | 10/1996 | Keeler et al. | 379/273 |
| 5,581,602 A | 12/1996 | Szlam | 379/67 |
| 5,588,045 A | 12/1996 | Locke | 379/67 |
| 5,594,781 A | 1/1997 | Kozdon et al. | 379/60 |
| 5,594,791 A | 1/1997 | Szlam et al. | 379/265 |
| 5,619,557 A | 4/1997 | Berkum | 379/88 |
| 5,623,540 A | 4/1997 | Morrison et al. | 379/115 |
| 5,675,637 A | 10/1997 | Szlam et al. | 379/142 |
| 5,689,240 A | 11/1997 | Traxler | 340/573 |
| 5,696,818 A | 12/1997 | Doremus et al. | 379/265 |
| 5,714,932 A | 2/1998 | Castellon et al. | 340/539 |
| 5,722,059 A | 2/1998 | Campana | 455/226.2 |
| 5,722,064 A | 2/1998 | Campana | 455/351 |
| 5,742,233 A | 4/1998 | Hoffman et al. | 340/573 |
| 5,815,565 A | 9/1998 | Doremus et al. | 379/265 |
| 5,825,283 A | 10/1998 | Camhl | 340/438 |
| 5,825,869 A | 10/1998 | Brooks et al. | 379/265 |
| 5,828,731 A | 10/1998 | Szlam | 379/88 |
| 5,832,059 A | 11/1998 | Aldred et al. | 379/34 |
| 5,832,070 A | 11/1998 | Bloom et al. | 379/265 |
| 5,940,494 A | 8/1999 | Rafacz | 379/265 |
| 5,963,635 A | 10/1999 | Szlam et al. | 379/309 |
| RE36,416 E | 11/1999 | Szlam et al. | 379/88.09 |
| 6,044,146 A | 3/2000 | Gisby et al. | 379/265 |
| 6,044,355 A | 3/2000 | Crockett et al. | 705/8 |
| 6,118,763 A | 9/2000 | Trumbull | 370/231 |
| 6,134,530 A | 10/2000 | Bunting et al. | 705/7 |
| 6,157,655 A | 12/2000 | Shtivelman | 370/412 |
| 6,269,153 B1 | 7/2001 | Carpenter | 379/88.02 |
| 6,272,347 B1 | 8/2001 | Griffith et al. | 455/445 |
| 6,314,089 B1 | 11/2001 | Szlam et al. | 370/270 |
| 6,359,892 B1 | 3/2002 | Szlam | 370/401 |
| 6,359,982 B1 | 3/2002 | Foster et al. | 379/266.06 |
| 6,362,838 B1 | 3/2002 | Szlam et al. | 345/762 |
| 2002/0047859 A1 | 4/2002 | Szlam et al. | 345/705 |
| 2002/0067822 A1 | 6/2002 | Cohen et al. | 379/265.12 |
| 2002/0143878 A1 | 10/2002 | Birnbaum et al. | 709/205 |
| 2002/0145624 A1 | 10/2002 | Szlam et al. | 345/738 |
| 2002/0161896 A1 | 10/2002 | Wen et al. | 709/227 |

\* cited by examiner

FIG. 1

(PRIOR ART)

FIG. 5

METHOD AND APPARATUS FOR CONTROLLING A CONTACT CENTER

TECHNICAL FIELD

This invention relates to telecommunications contact centers, and more specifically, to an improved technique of controlling and monitoring a plurality of agent stations in the contact center.

BACKGROUND OF THE INVENTION

Many large customer oriented companies maintain a call center in order to permit agents to interact with customers. A typical example of such a call center would be that maintained by an airline or credit card company, where customers may call in with questions, make reservations, etc. Often the call centers include the ability to do automated outbound calling to selected customers as well.

Recently, these call centers have evolved into full "contact centers." A contact center is substantially the same as a call center other than the fact that communications may be in a variety of media, instead of just by telephone. For example, a contact center may have the ability to support agent customer interaction via e-mail, web chat, video, etc. The particular types of interactions are the subject of the client's own choice, and the contact center may support some or all such interactions.

Contact centers will often co-exist and complement PBX systems. PBX systems provide telephony functions to a set of users in a business environment. In one type of architecture, contact center software will direct the operation of the PBX via a computer telephony interface (CTI) link.

Recently, full contact center systems have become available that comprise both contact center software and contact center switches in a single system. One such contact center system is sold by the Assignee of the present patent application under the trademark CCPRO. These contact center systems typically comprise a plurality of call center software applications as well as switching capability for routing incoming and outgoing contacts between customers and agents. In many modern contact centers, the call center system is added to an existing PBX system.

When adding a call center system, an issue arises regarding how to integrate such new hardware, and associated software, with the existing PBX and agent stations. Specifically, both the PBX and the contact center switch contain switching capacity, and both may be addressing the same set or subset of users. Thus, there is the potential for conflict in controlling the operation of the call center. It is important to note that either the PBX or the contact center switch can use either traditional analog or digital telephony to connect the desktop devices together, and to connect desktop devices to the public networks; or either or both the PBX or the contact center switch can use packet or cell based data networks—for example, an Internet protocol network—to provide such connectivity.

Figure 1:
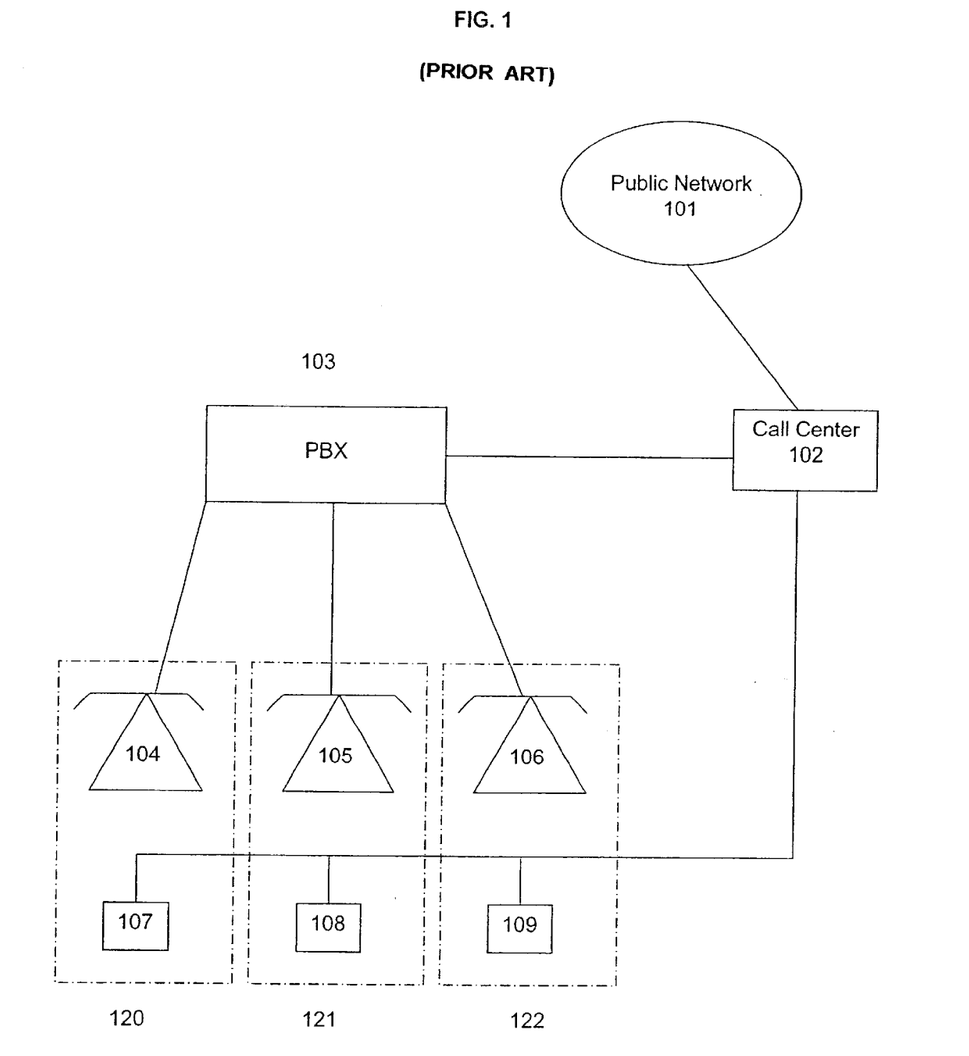
FIG. 1 shows prior art contact center configuration.

FIG. 1 shows a typical technique utilized to integrate the call center applications hardware/software (hereinafter "call center application's switch", "call center switch" or "switch") with the PBX. In the arrangement of FIG. 1, a semi-permanent connection is "nailed up" between call center applications 102 and telephones 104–106. The PBX is used to nail up this connection, operating as a semi-permanent patch panel rather than an actual switching device. Specifically, the PBX is utilized to establish semi-permanent connections from telephones 104–106 to call center applications switch 102. The semi-permanent connections are established when an agent logs on to the contact center system, and persist during the period of time in which the agent is logged in. Different semi-permanent connections are established through PBX 103 for each of the telephones 104–106. The nailed up connection is initiated by switch 102 after the agent at one of terminals 107–109 logs onto switch 102. Switch 102 knows which telephone extension is associated with each of terminals 107–109, and can thus nail up the appropriate connection. The data and voice terminal are associated with each other to form the agent positions 120–122 as shown.

In the arrangement of FIG. 1, call center switch 102 includes switching hardware analogous to that included in the PBX. Thus, all of the applications and the switching are executed on the hardware denoted call center switch 102. The PBX is simply left to patch connections together.

One problem with the arrangement of FIG. 1 is the increased cost resulting from all of the connections. Specifically, switch 102 requires a port to connect to each of data terminals 107–109, another port for each voice terminal 104–106 connected to the switch through the PBX 103, and still further ports for connecting to the public network 101. This increases hardware and software requirements, as well as cost, and also decreases reliability by having too many failure points.

Figure 2:
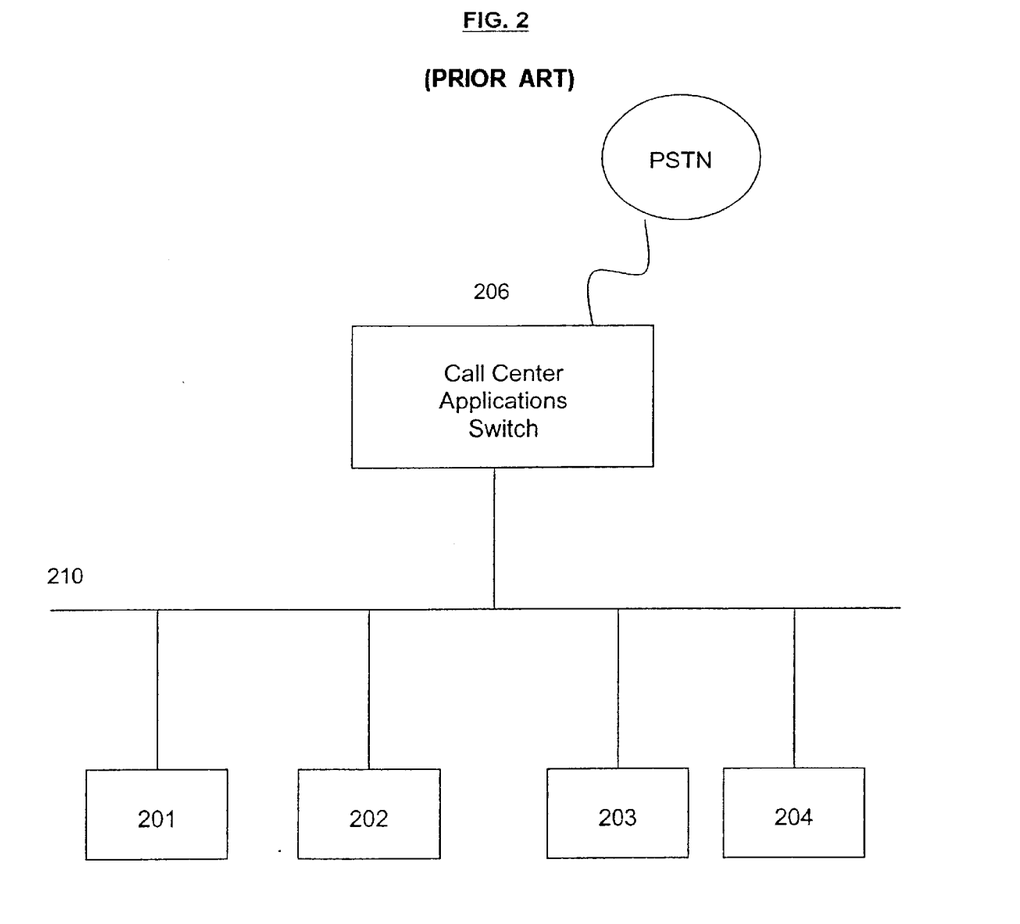
FIG. 2 shows a second prior art contact center configuration.

A second configuration for utilizing a call center application switch to implement a call or contact center is shown in FIG. 2. The arrangement of FIG. 2 includes a local area network (LAN) 210 for interconnecting the call center application switch 206 with a plurality of agent stations. The functionality required for all of the call center applications, as well as the ability to switch contacts into and out of the call center, is contained within call center application switch 206. It is noted that while the LAN 210 is shown as interconnecting the agents with the call center application switch, separate connections between the call center switch 206 and agents 201–204 may also be implemented. The approach shown in FIG. 2 also has several flaws. One problem is that the PBX is eliminated from the entire architecture. The functionality of the PBX is instead implemented in call center application switch 206. However, since such a switch is not designed to be a full PBX, some of the functionality of a typical PBX is not included in such a call center switch. For example, general purpose conferencing, unified messages and other functions normally included in the PBX are typically not included in a call center applications switch.

Figure 3:
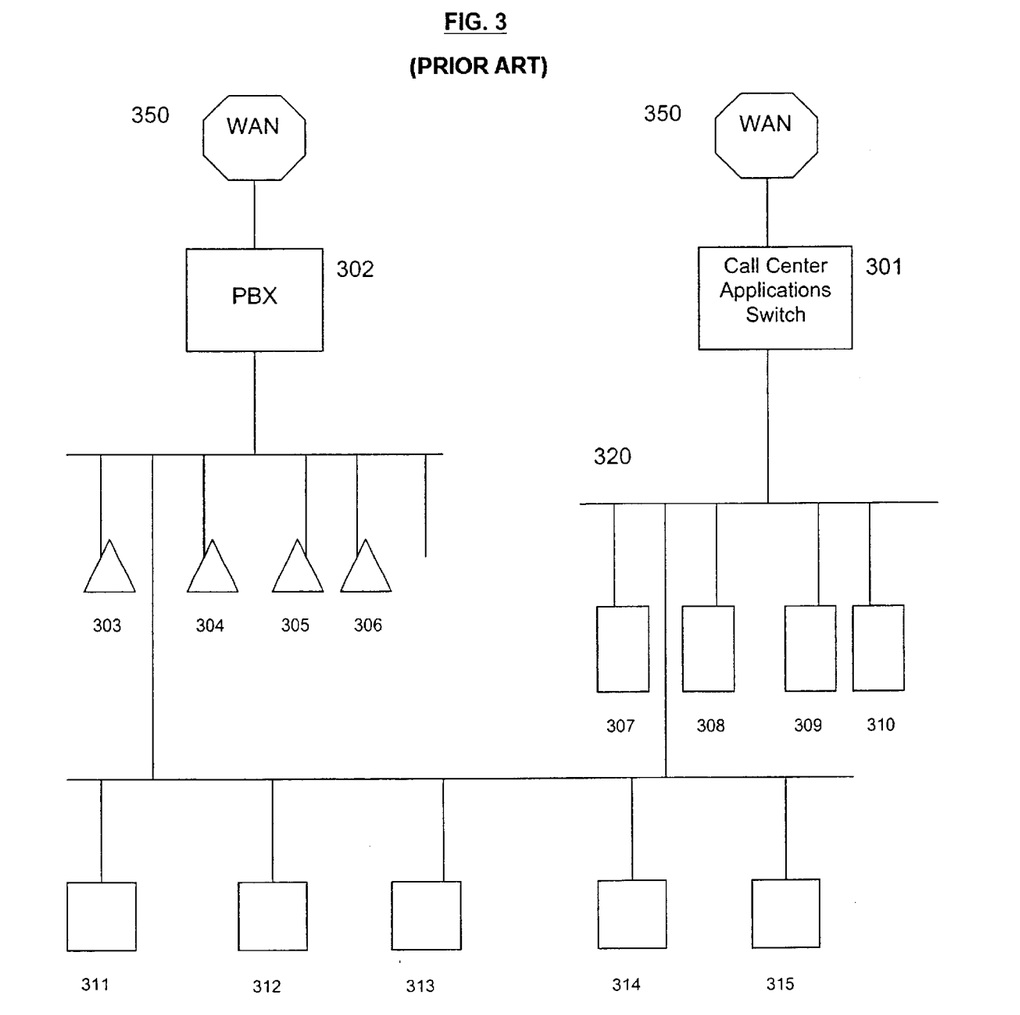
FIG. 3 shows still another prior art contact center configuration in which a contact center utilizes both a PBX and a contact center switch.

Still another architecture for integrating a call center application switch with the PBX is shown in FIG. 3. The architecture of FIG. 3 includes a separate PBX 302 and a call center applications switch 301. Each of the PBX 302 and call center application switch 301 may independently talk to a wide area network (WAN) 350. Agents that require a call center applications to service customers are connected to a LAN 320 for communication with call center applications switch 301. General personnel within the company, whose telephone sets are indicated by 303–306, are connected only to PBX 302 for general inbound and outward calling. Finally, supervisory personnel 311–315, who require access to both the PBX 302 for general calling purposes, and to call center applications switch 301 to monitor and/or participate in call center applications, are connected to both PBX 302 and call center applications switch 301.

The arrangement of FIG. 3 permits those personnel utilizing mostly PBX functionality to configure their systems with only one port for access to the PBX. Personnel stationed at stations 307–310 are typically configured for access to call center applications switch 301. The disadvantages of the arrangement shown in FIG. 3 is that any of the personnel at stations 311–315 may be on the telephone or servicing a contact from either PBX 302 or call center applications switch 301, when the other of the two requests contact with the particular person. Moreover, the stations 311–315 which require access to both, also require duplicative hardware and software.

In view of the above, there exists a need in the art for an improved and economical manner in which a contact center system can be integrated into a system, which also includes a PBX. Ideally, the functionality of both the PBX and contact center applications switch 301 should be utilized in conjunction with one another to maximize the effectiveness of the system.

SUMMARY OF THE INVENTION

The above and other problems with the prior art are overcome in accordance with the present invention, which relates to an integrated contact center capable of inward/outbound calling which utilizes both a call center application switch and a conventional PBX. Both are in communication with all agents over a local area network, and software resident preferably in the applications switch control—directly or indirectly—which of either the applications switch or the PBX accesses and/or controls the various agent stations.

Control of agents stations may be passed between the PBX and contact center switch either on a temporary bases or a semi-permanent basis, or even on a permanent basis. Tables may be maintained in the call center applications switch indicating all of the agents available online, and which of the PBX or call center applications switch has control over such agents.

DETAILED DESCRIPTION OF THE PREFERRED EMBODIMENT

Figure 4:
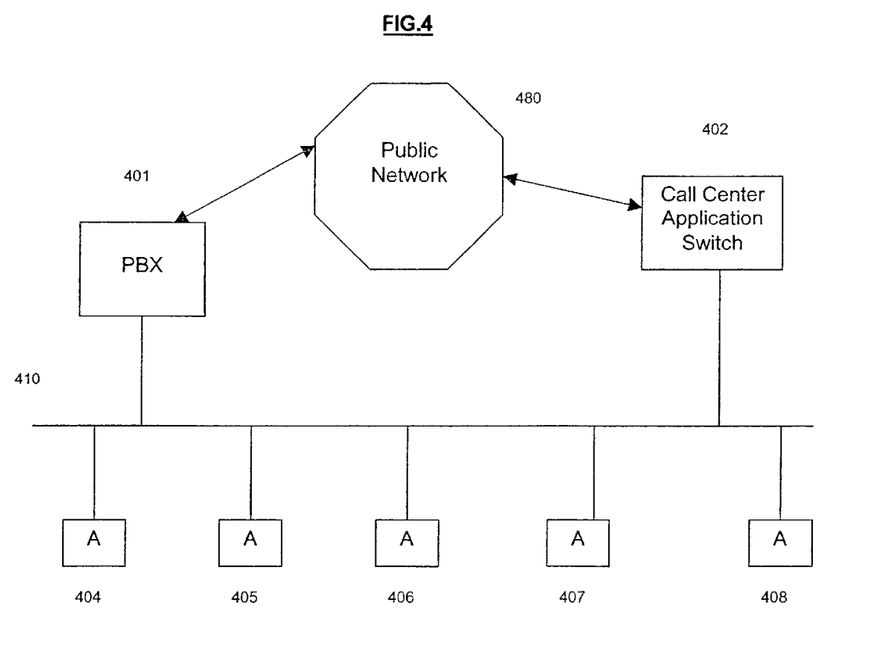
FIG. 4 shows the architecture an exemplary embodiment of the present invention.

FIG. 4 depicts a high level functional diagram of the basic architecture of the present invention. The arrangement of FIG. 4 represents only an exemplary embodiment, and other network configurations are possible.

Public network 480 may be the public switched telephone network (PSTN) or, in the case of more modern contact centers, may be the Internet. Moreover, it is possible that either PBX 401 or switch 402 may communicate with one or both of the Internet and the PSTN. The arrangement of FIG. 4 also includes a local area network (LAN) 410, exemplary agent terminals 404–408, each connected to communicate with the PBX 401 via LAN 410. Each agent is also connected to contact center switch 402, and may access the contact center applications as needed. Each agent station 404–408 may include an audio terminal and a data terminal.

In operation, the PBX switch fabric within PBX 401 can respond to and initiate communications between any desktop device 404–408 and any other desktop device 404–408 and/or public network 480. The default condition is that the PBX is connected to the desktop agents 404–408 and has complete control over such agents. When a particular agent desires to log directly into the switch 402, that agent logs on and the switch 402 then takes control over the desktop from the PBX 401.

Optionally, the switch 402 may advise the PBX 401 over LAN 410 of the hand-off in control for a particular agent. Alternatively, the desktop agent itself may send either an in-band or out of band message to PBX 401 indicating that control has been passed off to the switch 402. Another method is for the contact center switch to initiate a connection to the appropriate agent at the beginning of the agent's shift via the PBX. This is accomplished by sending a signal to the PBX to create a virtual connection from the contact center switch to the agent; in this instance, the contact center switch looks to the PBX like a set of desktop devices or a set of multi-channel packet trunks—no special protocol or API is required to coordinate interaction between the PBX and the contact center switch.

In all cases, since only control information is sent to the PBX from the contact center switch, and such control information goes over the existing local area network, no extra hardware is required to establish and maintain the connection between the contact center switch and the agent desktop, yielding a cost-effective solution for coordinating interaction between the contact center switch and the PBX.

Once an agent is logged into the switch 402, the switch 402 may interact with such agent to facilitate the implementation of numerous applications. Such applications may involve the interconnection of agent stations with parties over public network 480, the interaction of agent stations with other computers, and/or any of a variety of functions typical of contact centers.

The switch 402 may also interface with other peripherals (not shown) such as database servers, integrated voice response systems, etc. The switch 402 may have more or less switching capacity than PBX 401.

In an additional embodiment, the switch 402 and PBX 401 may arbitrate control of specific agent stations over LAN 410. The switch 402 may itself control which of PBX 401 or switch 402 controls any particular agent station.

During contact center operation, the switch 402 switching fabric may occasionally need to connect with a desktop agent station being controlled by PBX 401. Such a scenario could arise when a contact taking place via switch 402 requires a supervisor or other desktop agent to patched in, and wherein such supervisor or other desktop agent is controlled by the PBX 401 rather than switch 402. Such temporary patch-ins can be accomplished via a temporary hand-off for a particular contact. After the contact is completed, control will automatically revert back to the PBX for the additional agent patched into the switch 402.

One exemplary technique for accomplishing the foregoing is to define a message exchange protocol between the PBX 401 and the call center switch 402. A default condition includes control of a specified agent, (e.g., 406) being vested in the PBX 401. When it is desired to redirect control of the agent to the call center application switch, a message is sent from the call center switch 402, to the PBX, which causes the PBX to relinquish control of the agent. Thus, the PBX 401 will no longer send messages to the agent and/or read responses. At a time when control was turned over to the call center application switch 402, the optional table within said switch 402 is updated to reflect the fact that call center switch 402 is now in control of the particular agent 406. Messages may now be transmitted from call center switch 402 to agent 406, and the PBX will send no further messages to agent 406 until advised to do so by call center switch 402.

Note that the handoff of control may optionally be accomplished without the agent 406 even knowing. Instead, the address of the PBX on the network is known to the call center switch 402. Thus, during such time as switch 402 has control, it will receive messages destined for the PBX network address and originated by agent 406 will process such messages. At the end of the time that switch 402 is controlling agent 406, it will send a message to PBX 401 to relinquish control and then cease itself to receive or process messages from agent 406.

By communicating with the switch 402 and PBX 401, all of the switching capacity of both of the modern switch 402 and the PBX 401 may be utilized. There is no master slave relationship, nor is the PBX utilized as a patch panel, thereby effectively wasting its switching capacity. Rather, the switching capacity of the contact center is comprised of the switching capacity of both of the PBX 401 and switch 402, thereby maximizing the use of all components in a hybrid configuration.

A table may be maintained within the switch 402. If control is to be transferred to the PBX 401, the table so indicates and the switch 402 then knows not to attempt control of such an agent. Alternatively, any of the agents 404–408 may designate whether they ought to be controlled by the switch 402 or the PBX 401. By sending an appropriate message to both PBX 401 and switch 402, control conflicts are avoided and the specified device maintains control of the desktop agent until a new message is sent by such agent. In such a system that allows each agent station to specify whether the call center 402 or the PBX 401, the call center switch 402 may still have the ability to at least temporarily override such preference. This ability would be utilized in the event that one of agents 404–408 is requested on a call that is not controlled by whichever of PBX 401 or switch 402 is controlling the subject agent. Thus, control is normally as specified by the agent, except for temporary overrides.

In other embodiments, the switch 402 itself may assign the PBX to handle certain agent stations, while maintaining control of other agent stations for itself based on any desired factors. This decision made by the switch may account for a variety of factors. For example, applications which involve agents simply receiving a call from a calling customer, and little more, may be handled by the PBX, since such applications require only basic switching capabilities. Other applications, which require conferencing, supervisors, or interface with other processors and computers and thus, require the vast functionality of switch 402, may be handled through such central processor.

Still another criteria for dividing control of desktop agents 404–408 may be the role in which any agent is placed at any particular duration of time. For example, an agent designated to a particular simplistic task which can be handled by the PBX 401 may be controlled solely by the PBX 401, whereas the same agent, when redesignated for other tasks, may be controlled by the central processor. The control may be divided among switch 402 and PBX 401 based upon simply the number of agents each is capable of controlling, as well as the switching capacity available in each of the switch 402 and PBX 401. Any subdivision of agents between one of more PBX's and one or more call center switches may be implemented, thereby allowing the switching capacity of both the switch 402 running the applications, as well as the PBX 401, to be used.

Figure 5:
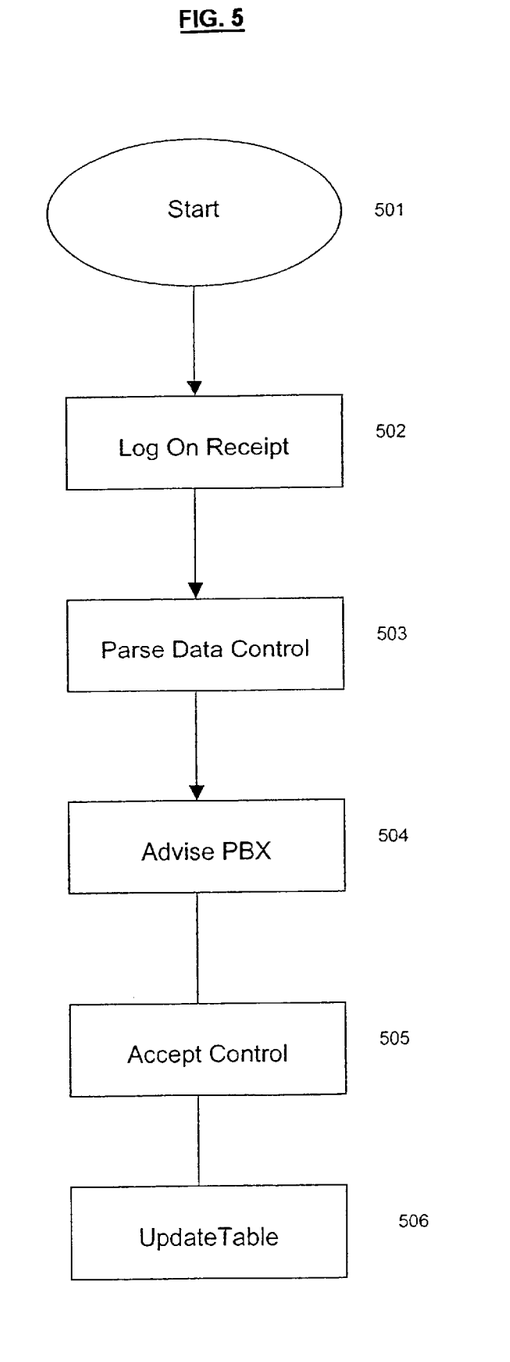
FIG. 5 shows a flow chart of software which preferably runs in the contact center switch in accordance with the teachings of the present invention.

FIG. 5 shows a high level flow chart of the steps executed by the switch 402 when one of agents 404–408 logs on. At start 501, the log on message is received at block 502 and control is transferred to block 503. The log on message includes information from the agent logging on indicative of whether such agent should be controlled by switch 402 or PBX 401. Such information may be derived by the roll in which the agent is acting, or privileges granted by the security software operable within each one of agent terminals 404–408.

The switch 402 determines whether it or PBX 401 will be controlling the particular agent and advises PBX 401 of the same at block 504. Control is then given to switch 402 at block 505, and tables indicative of each of the agents 404–408, as well as whether the PBX 401 or switch 402 is controlling each such agent, are updated.

It is noted that the functional diagram shown in FIG. 5 is for implementing the configuration in which the determination as to which of PBX 401 or switch 402 controls each of agents 404–408. It is notable however, that the determination may be made in advance in the programming of switch 402. Specifically, as previously noted, switch 402 may itself include a preprogrammed table indicative of which of the agents should be controlled by itself, as well as which agent should be controlled by PBX 401. In such a case, when an agent logs on the switch immediately looks up the appropriate information and either transfers control the PBX 401 if required or maintains control of the agent on its own. Alternatively, the switch can be programmed to a default, with the agent having an option to override that default.

While the above describes the preferred embodiment in the invention, various modifications or additions will be apparent to those of skill in the art. Such modifications and additions are intended to be covered by the following claims.

What is claimed:

1. Apparatus for controlling a plurality of agent stations in a contact center, said apparatus comprising:
   a switch, for running contact center applications software and for controlling agent stations and facilitating switching between agent stations and customers or other agent stations;
   a Private Branch Exchange (PBX) for controlling agent stations and for facilitation switching between said agent stations and said customers or other agent stations;
   wherein the switch and the PBX are mutually exclusive with respect to controlling agent stations such that each of the agent stations is controlled by either the switch or the PBX at any given time; and
   control means for determining whether a particular agent station should be controlled by said PBX or said switch, and for allocating said control.

2. The apparatus of claim 1 wherein said control means is contained within said switch.

3. The apparatus of claim 1 wherein said control means relies at least in part on a message sent from a particular agent in order to determine whether said particular agent should be controlled by either the PBX or the switch.

4. The apparatus of claim 3 wherein said control means maintains a table indicative of which of said agent stations are presently being controlled by said switch, and which are being controlled by said PBX.

5. The apparatus of claim 1 wherein said control means allocates control to said PBX for some duration and then allocates control to said switch for some duration.

6. The apparatus of claim 1 wherein said allocation is dynamic, said control being changed repeatedly from said PBX to said switch during operation.

7. The switch of claim 1 wherein said control means dynamically varies, during system operation, which agents are controlled by said PBX.

8. Apparatus for implementing a contact center comprising:
- a PBX, for switching contacts within said contact center, and for controlling agent stations;
- a switch, for switching contacts within said contact center, and for controlling agent stations;
- wherein the switch and the PBX are mutually exclusive with respect to controlling agent stations such that each of the agent stations is controlled by either the switch or the PBX at any given time; and
- a central processor, said central processor comprising means for controlling whether said switch or said PBX is responsible for controlling and switching said contacts within said contact center to and from any particular agent.

9. The apparatus of claim 8 wherein said switch further comprises means for running software contact center applications, said applications being implemented in contacts controlled by said PBX as well as in contacts controlled by said switch.

10. The apparatus of claim 8 wherein said means for controlling comprises apparatus for temporarily changing a particular agent contacts from being controlled by said PBX to being controlled by said switch for the purpose of a single contact or portion thereof.

11. Apparatus of claim 9 wherein said means for controlling comprises apparatus for temporarily changing a particular agent contacts from being controlled by said switch to being controlled by said PBX for the purpose of a single call.

12. A method of switching contacts through a contact center to an agent comprising:
- determining, for a particular agent, which of either a PBX or other switch should control the particular agent, wherein the PBX and the switch are mutually exclusive with respect to controlling the particular agent such that each of the agent is controlled by either the switch or the PBX at any given time; and
- after said determination, switching said contact through to said agent via either the PBX or the switch, as said determining step requires.

* * * * *